United States Patent [19]

Stanton

[11] Patent Number: 5,428,408
[45] Date of Patent: Jun. 27, 1995

[54] COLOR CORRECTION SYSTEM FOR PROJECTION VIDEO SYSTEM UTILIZING MULTIPLE LIGHT SOURCES

[75] Inventor: Douglas A. Stanton, Ossining, N.Y.

[73] Assignee: Philips Electronics North America Corporation, New York, N.Y.

[21] Appl. No.: 249,419

[22] Filed: May 26, 1994

[51] Int. Cl.⁶ .............................................. H04N 9/31
[52] U.S. Cl. ..................................... 348/742; 348/744
[58] Field of Search ............... 348/748, 755, 756, 758, 348/742, 743, 764, 770, 771, 795, 750, 751; H04N 09/31; 359/48, 49, 66–68, 88, 89

[56] References Cited

U.S. PATENT DOCUMENTS 2,530,107 11/1950 Webb ..................................... 348/743
5,233,338 8/1993 Surguy ................................... 348/742

Primary Examiner—Victor R. Kostak
Assistant Examiner—Nathan J. Flynn
Attorney, Agent, or Firm—Michael J. Balconi-Lamica

[57] ABSTRACT

A color correction system for a video projection system utilizing a single light valve for modulating light impinging thereon with a video signal and three projection lamps, one for each of the primary colors, which are activated sequentially. Positioned in the light path between two of the lamps and the light valve are occluders which block and unblock the light output from their associated lamp. The lamps which have the occluders are operated such that each lamp may be driven with a series of non-occluded pulses and occluded pulses. The occluded pulses occur when the occluder blocks the light output from the lamp. The more a desired reduction in light output in one of the colors is required, the non-occluded pulses are reduced and the corresponding occluded pulses are increased. This permits adjustment of the colorimetry of the system without adversely affecting the electrical properties of the lamp. As such, the electrical power input to each of the lamps remains within operational parameters but the light output of a particular color as seen by the light valve, and thus the viewer, may be reduced.

15 Claims, 3 Drawing Sheets

COLOR CORRECTION SYSTEM FOR PROJECTION VIDEO SYSTEM UTILIZING MULTIPLE LIGHT SOURCES

BACKGROUND OF THE INVENTION

This invention relates to projection video systems and specifically to a color correction systems for a projection video systems utilizing a single light valve, but multiple sources of illumination.

Most commercially available projection video systems utilize separate projection systems for each of the three primary colors. The systems thus require three light valves with separate optical systems which must be accurately converged on the screen, which adds to complexity and expense. Recently, projection video systems utilizing only a single light valve have been developed. One such system is a color field sequential system, in which the normal video field, 1/60th of a second, is broken into three parts, or color subfields of 1/180th of a second. During the three color subfields, the light valve is illuminated with red, green and blue light sequentially. While the light valve is illuminated with any given color, the video data corresponding to that color is displayed on the light valve. The eye then fuses the three color sub-fields into a single, full color field. The eye also fuses successive video fields and frames into full motion, full color video.

Recently, improved light valves particularly suitable for use in projection television systems have become available. One such device is a so-called deformable mirror device (sometimes called a digital mirror device or DMD) which is illustrated in U.S. Pat. No. 5,079,544 and patents referenced therein, in which the light valve consists of an array of tiny movable mirror-like pixels for deflecting a beam of light either to the display screen (on) or away from the display optics (off). This device is suitable for use in a field sequential system because its pixels are capable of being switched very rapidly. By further rapid switching of the pixels a grey scale is generated.

In addition to improved light valves for use in projection video systems, improved projection lamps are also now available. These projection lamps are highly efficient and have a long life. Furthermore, these lamps are physically quite small and have a small arc length. Small size and small arc length can significantly reduce the size and cost of the optics used to project the light onto the light valve as well as onto the viewing surface. Smaller optics can considerably reduce the overall cost of a video projection system since the optical elements of the system are a very significant portion of the overall cost. Many such lamps are also capable of following an electrical drive signal with good fidelity, i.e. they have a fast rise and fall time and can follow any reasonable waveform, including squarewaves. One such lamp is the Philips CSL-R100W Ultra High Pressure Projection lamp.

However, many otherwise suitable lamps may not have even color distribution across the visible spectrum, i.e. they may be deficient in one or more colors. Furthermore, these lamps have carefully designed thermal properties which require operation at a given power level in order to assure optimal power dissipation. Accordingly, such lamps require a consistent power input over time, such as 100 watts. If greater power is input to the lamp, the lamp will have a significantly shortened life span but turning down the power input to the lamp will cause the lamp to become unstable or go out altogether. The present invention is directed towards providing a three-lamp, single light valve projection video system that can take full advantage of these improved projection lamps while operating the lamps at optimum parameters.

In addition to correcting for any color spectrum deficiencies of the projection lamps used in a projection video system, a suitable video projection system must also provide for color correction of the dichroic filters utilized to convert the white light output from the projection lamps to the primary colors. Dichroic filters are manufactured in a batch process and there are sample to sample variations in the colorimetry of these filters. Additionally upon exposure to the intense light of projection lamps, the colors of the dichroic filters may fade. Accordingly, any suitable projection system must be able to compensate for batch to batch variation and/or fading of the dichroic filters. Finally, a suitable projection video system should also provide for color correction based on user preference, either statically or dynamically.

U.S. patent application Ser. No. 08/141,145 filed Oct. 21, 1993 entitled "Color Correction System for Video Projector", is directed to a method for dynamically color correcting a projection video system utilizing a single projection lamp, a color wheel of dichroic filters and a single light valve. The disclosure of U.S. application Ser. No. 08/141,145 is hereby incorporated by reference, as if fully set forth herein. The present application is directed to a color video projection system utilizing multiple projection lamps and a single light valve.

SUMMARY OF THE INVENTION

This invention is directed to a color correction system for a projection video system utilizing a single light valve with multiple projection lamps. The system is capable of varying the light output of the projection lamps without varying the electrical power input thereto so as to permit the lamps to be driven in accordance with their operating parameters. The system occludes unwanted optical output in synchronization with system requirements and is responsive to user input as well as dynamically electrically controllable.

The video projection system includes a light valve for modulating light impinging thereon with the video signal and three projection lamps, one for each of the primary colors, which are activated sequentially. Positioned in the light path between two of the lamps and the light valve are occluders which block and unblock the light output from their associated lamp. The lamps which have the occluders are operated such that each lamp may be driven with a series of non-occluded pulses and occluded pulses. The occluded pulses occur when the occluder blocks the light output from the lamp. The more a desired reduction in output in one of the colors is required, the non-occluded pulses are reduced and the corresponding occluded pulses are increased. This permits adjustment of the color temperature of the system to user preference without adversely affecting the electrical properties of the lamp. As such, the electrical power input to each of the lamps remains within operational parameters but the optical output of a particular color as seen by the light valve and thus the viewer is reduced.

BRIEF DESCRIPTION OF THE DRAWINGS

For better understanding of the invention, reference is made to the detailed specification to follow, which is to be taken in conjunction with the following drawing figures.

DETAILED DESCRIPTION OF THE PREFERRED EMBODIMENTS

Figure 1:
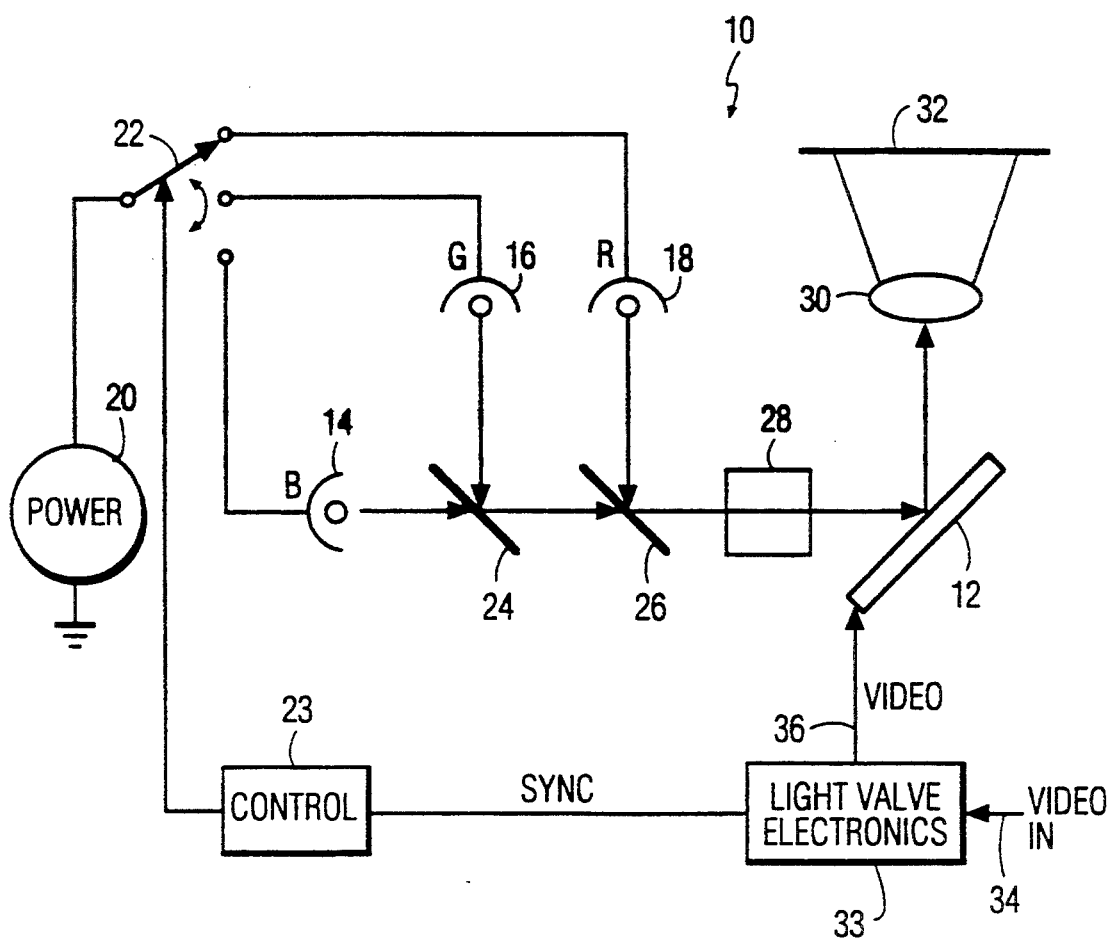
FIG. 1 is a schematic diagram of a projection video system using multiple projection lamps and a single light valve.

FIG. 1 illustrates schematically an illumination system for projection color video system utilizing three of projection lamps to illuminate a single light valve. This illumination arrangement nearly triples the brightness of the projected image over a single lamp, single light valve system. FIG. 1 illustrates an illumination system 10 for illuminating a light valve 12 by three projection lamps 14, 16 and 18. The projection lamps 14, 16 and 18 are driven from a power source 20 by a sequential switch (commutator) 22 operated by control electronics 23. As is shown in FIG. 1, the white light emitted by each of the lamps is directed to dichroic mirrors 24, 26. Dichroic mirror 24 reflects green light and transmits blue light. Thus, the light from lamp 14 after passing through dichroic mirror 24 will have color components other than be blue subtracted and the light from lamp 16 after reflecting from dichroic mirror 24 will be green as its other components will not be reflected from mirror 24. Dichroic mirror 26 reflects red light and passes blue and green light. Thus, the red components of light emitted by lamp 18 will be reflected by dichroic mirror 26 to light valve 12.

The net result of the lamp and filter arrangement is that when lamp 14 is activated by switch 22, light valve 12 will be illuminated by blue light only, when lamp 16 is activated, DMD 12 will be illuminated by green light only and when lamp 18 is activated, light valve 12 will be illuminated by red light only. Integrator optics 28 may be disposed between dichroic mirror 26 and light valve 12 so as to provide a uniform field of illumination. Light valve 12 modulates the light under the control of light valve electronics 33 in accordance with the incoming video information 34. After modulation by light valve 12, the light passes to optics 30 and viewing screen 32. Light valve electronics 33 also provides a sync output signal 38 to the input of electronics 23 which controls switch 22. The color subfields generated will be integrated by the eye into a full color picture.

Figure 2:
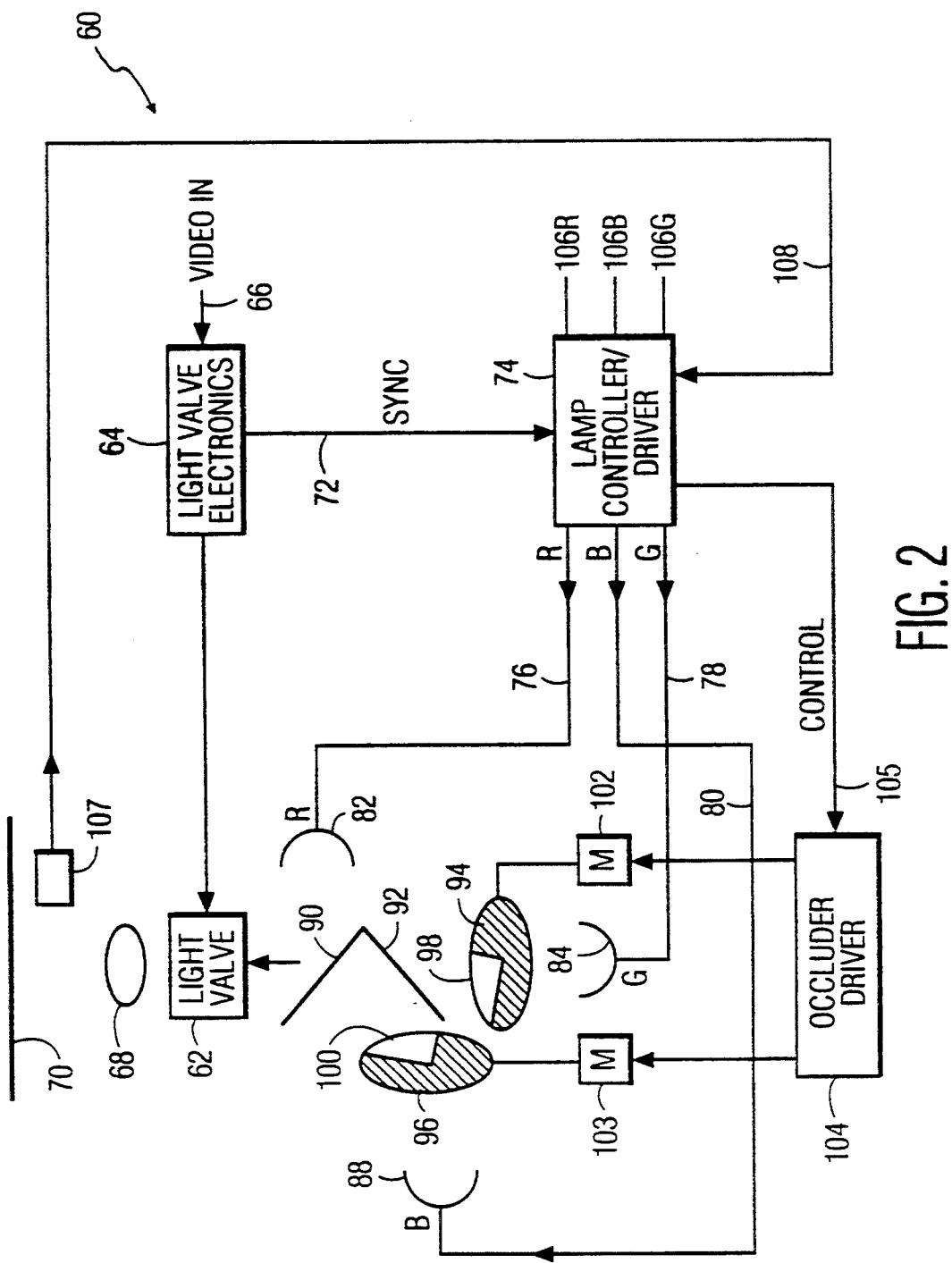
FIG. 2 illustrates a schematic diagram of a color projection video system utilizing three projection lamps and a single light valve and a means for dynamically adjusting the colorimetry of the system.

FIG. 2 illustrates a multiple lamp, single light valve projection video system 60 which permits varying the light output of the projection lamps, so as to provide for color control, without varying the electrical power input to the projection lamps so that the optimal operating conditions are maintained. System 60 includes a light valve 62 driven by light valve electronics 64 which in turn receives an input video signal 66. Light valve 62 modulates light impinging thereon in accordance with video signal 66 under the control of the light valve electronics 64. Light valve 62 is sequentially illuminated with red, green and blue light. While light valve 62 is illuminated with a given color (a color subfield), the video data corresponding to that color is displayed on the light valve by light valve electronics 64. The eye fuses the three color subfields into a single full color field and successive video fields into a full motion, full color video. The modulated light from the light valve is projected by projection optics 68 to a viewing screen 70, which may be of the front or rear projection configuration.

A synchronization signal 72 is output from light valve electronics 64 to a lamp controller/driver 74. Lamp controller/driver 74 has separate drive (power) outputs 76, 78, 80 to three separate projection lamps 82, 84, 88. Disposed in the output path of projection lamps 82, 84, 88 are dichroic filters 90, 92. Dichroic filter 90 reflects red light and passes blue and green light. Thus, the red component of the white light output of lamp 82 will be reflected by dichroic mirror 90 to light valve 62. Dichroic filter 92 reflects blue light and passes green light. Thus, the green component of the white light output of projection lamp 84 will be passed through of dichroic filter 92 and will impinge on light valve 62 after passing through dichroic filter 90 which also passes green light. Dichroic filter 92 will also reflect the blue component of projection lamp 88 and illuminate light valve 62 with it after passing through dichroic filter 90. Thus, the net result of the arrangement of projection lamps 82, 84, 88 and dichroic filters 90, 92 is that projection lamp 82 functions as the "red" illumination lamp, projection lamp 84 functions as the "green" illumination lamp and projection lamp 88 functions as the "blue" projection lamp.

Also disposed in the illumination path of "green" projection lamp 84 is an occluder (shutter wheel) 94. A second occluder 96, is positioned in front of "blue" lamp 88. Occluders 94, 96 have been illustrated in their simplest form, that is of circular rotating wheels which are approximately ⅔ opaque with light transmissive segment 98 in wheel 94 and a light transmissive segment 100 in wheel 96. Occluders 94, 96 are driven by phase locked servo motors 102, 103 which are controlled by occluder driver 104 which receives a control input 105 from lamp controller/driver 74. Lamp controller/driver 74 includes user inputs $106_R$, $106_G$ and $106_B$ so that the overall colorimetry of the projected image may be adjusted. Additionally, a color sensor 107 located at the output of light valve 62 may also input a signal 108 to lamp controller/driver 74 to permit automatic adjustment of color temperature.

Figure 3:
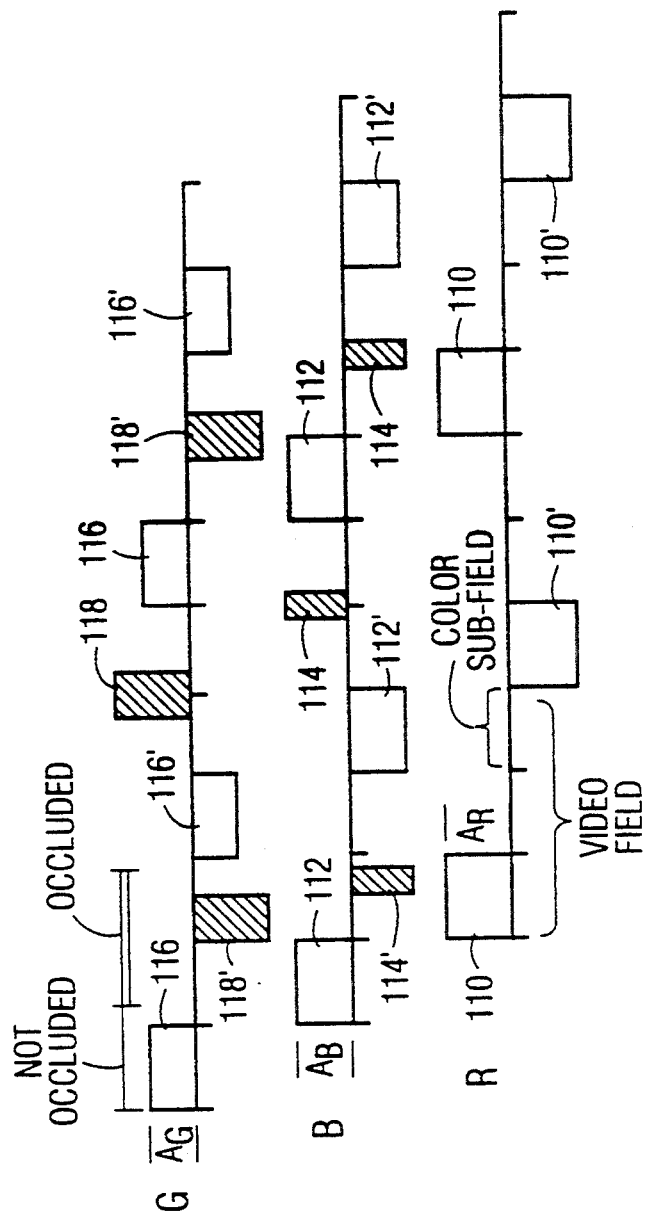
FIG. 3 is a timing diagram of the driving and occluded pulses for the three projection lamps.

The synchronization and drive arrangement for the three lamps 82, 84, 88 and the two occluders 94, 96 is shown in FIG. 3. If extremely precise color control or a greater range of adjustment is needed, a third occluder can be positioned in front of "red" lamp 82, however there is generally no need for occluders in front of all of the lamps because the relative color balance of the system can be adjusted by changing the light output of two of the three primary colors. As a practical matter, the un-occluded lamp will be that of the color which the lamp is least spectrally efficient. For the purposes of this discussion, we will assume that this is "red" lamp 82.

FIG. 3 illustrates the electrical power output to the "red", "green" and "blue" lamps through lines 76, 78 and 80. As is indicated on the bottom (red) graph of FIG. 3, the small tick marks indicate the color subfields with the video field comprising three color subfields. The lowermost graph of FIG. 3 illustrates the power output through line 76 to lamp 82 which forms the red illumination. As is seen a positive going pulse 110 is applied to lamp 82 for one color subfield (in this case red). No power is applied to lamp 82 for the next two color subfields (i.e. the green and the blue subfields). Thereafter, a negative going pulse 110' is applied to lamp 82 through line 76. The result of this operation is that lamp 82 is energized for one-third of the video field with an amplitude $A_R$ with pulses both positive 110 and negative 110 going so that the lamp is driven under optimal conditions. In FIG. 3 the electrical power input to the lamps is the amplitude of the pulses times the duration of the pulses. As is seen in FIG. 3, the amplitude $A_R$ of "red" pulses 110 is greater than that of the other colors as will be described in detail below.

The middle timing chart of FIG. 3 illustrates the power input to lamp 88 which is the "blue" lamp by the action of dichroic filter 92. Also disposed in the illumination path of lamp 88 is occluder 96. As is seen, lamp 88 is powered by a series of positive pulses 112 and negative pulses 112' for one-third of the video field (i.e. during the "blue" color subfield). Pulses 112, 112' occur when the light transmissive segment 100 of occluder 96 is positioned in front of lamp 88. However, the blue power pulses 112, 112' have an amplitude $A_B$ (illustrated by the height of pulses 112, 112' in graph 4) which is less than that of red pulses 110, 110'. Thus, the total power of non-occluded pulses 112 and 112' is less than the full power requirement of lamp 88. However, as noted above, many sophisticated projection lamps cannot be operated at less than full power, averaged over a period of time, without operational difficulties which can lead to premature lamp failure.

In order to restore proper electrical power input to lamp 88, it is activated with a series of compensatory pulses 114, 114' which are again both positive and negative going. However, the pulses 114, 114' occur when the opaque portion of occluder wheel 96 is positioned so as to block the light output from lamp 88. Thus, there is no light output to light valve 62 by lamp 88 during pulses 114, 114'. The duration and amplitude of the pulses 114 and 114' are adjusted so as to restore the total electrical power input to lamp 88 to the desired amount so that its operational characteristics will not be affected. The amplitude $A_B$ of non-occluded pulses 112', 112 is less than that of "red" pulses 110, 110'. However, the total electrical power input to lamp 88 is the sum of non-occluded pulses 112, 112', and occluded pulses 114, 114'. The result of this operation is that the optical output of lamp 88 to light valve 62 is reduced but its electrical input remains at the optimal level so that its operational characteristics are not affected.

Similarly, "green" lamp 84 is driven with a series of non-occluded pulses 116, 116' and a series of occluded pulses 118, 118'. It is seen that the amplitude $A_G$ of non-occluded pulses 116 are the lowest which means that the non-occluded electrical input to the "green" lamp 84 is the lowest, which would be the case where the lamp is spectrally efficient in green. Accordingly, the compensatory occluded pulses 118, 118' are the largest so that the total power input to lamp 84 remains at the optimum level. In summary, as the drive arrangement in FIG. 3 illustrates, all of the lamps see exactly the same input electrical power so that their operating characteristics are optimum.

In operation, if the user deems the picture on screen 70 to be "too green", the user would operate control $106_G$ which causes lamp controller 74 to alter the relationship of the driving pulses on line 78 to lamp 84. If a reduction in green is desired, non-occluded pulses 116, 116' are reduced in amplitude. However, in order to maintain proper electrical power input to lamp 84, occluded pulses 118, 118' are increased in amplitude so that the total electrical power to lamp 84 remains the same. Since, however, the non-occluded pulses have been reduced in amplitude, the total light output of lamp 84 is reduced and thus the overabundance of green is compensated for. A similar operation will occur with respect to blue lamp 88. If the picture projected on screen 70 is too blue, non-occluded pulses 112, 112' to lamp 88 are reduced and occluded pulses 114, 114' would be increased by operation of control $106_B$.

The question arises as to how to compensate for a picture that is "too red" since "red" lamp 82 has no occluding device positioned in front of it and, as noted above, its power input cannot be turned down without possible malfunction. The answer is that both blue and green power is reduced by controls $106_G$, $106_B$ so that the relative amount of red increases. The automatic control of color sensor 107 would also cause lamp controller/driver 74 to operate in a similar manner to adjust the color balance to a preset point.

Occluder driver 104 drives motors 102, 103 so that the light transmissive portions of occluders 94, 96 are positioned in front of their respective lamps 84, 88 during the time that the non-occluded pulses occur. Occluder driver 104 receives a control input from lamp controller/driver 74 which in turn is synchronized to light valve 62 by light valve electronics 64 so that occluders 94, 96 are synchronized to the incoming video and illumination signals. As a practical matter the requirement that the light valve be loaded with video data constrains the start and stop points of the non-occluded pulses to defined non-arbitrary locations. However the occluded pulses 114, 114', 118 and 118' may occur at any time during the other two-thirds of the video field, the timing between occluders 94, 96 and the occluded pulses is thus not particularly critical. It is merely necessary that the occluded pulses occur during the period when the output of the respective lamps are occluded. Further, the waveform of the occluded pulses is not critical and may be of any form sufficient to drive the lamps under optimum operating conditions. The waveforms of the occluded pulses may also be utilized to facilitate re-ignition of the lamps by the non-occluded pulses.

The devices used to occlude the light output from the projection lamps need not be motor driven shutter wheels as illustrated in FIG. 2. The occluders may be any form of controllable shutter suitable for occluding the output of projection lamps. Such suitable occluders can be mechanical shutters operated electrically or shutters in the form of electrically operated dispersive liquid crystal devices. The only requirement is that the shutter be capable of a synchronized operation with the illumination of the lamps. Mechanical variable density occluders could also be used to provide the function of the occluder wheels, however this would preclude dynamic color adjustment.

Lamp controller/driver 74 may be implemented in a number of ways. Similar to the lamp driver in application Ser. No. 141,145 referred to previously; controller driver 74 may consist of a voltage output square wave generator coupled to a current amplifier whose three outputs follow the voltage inputs. Many commercially available power supplies may also be used, the only requirement is that the controller driver be capable of proportioning the power output between the non-occluded and occluded pulses so that the total power supplied to each lamp remains constant. The three separate color controls 106$_R$, 106$_B$, and 106$_G$ may also be replaced with a single "tint" control.

The above-described embodiments are merely illustrative of the principles of the present invention. Numerous modifications and variations thereof will be readily apparent to those skilled in the art without departing from the spirit and scope of the present invention.

What is claimed is:

1. An illumination system for a projection video system comprising:
    a light valve for modulating light impinging thereon in accordance with a video signal;
    first, second and third lamps for illuminating said light valve;
    means for altering the color of the light emitted by said first, second and third lamps so that said light valve is illuminated with first, second and third colors of light;
    occluder means positioned between at least one of said first, second and third lamps and said light valve, said occluder means having a first operational state in which the light from its associated lamp reaches said light valve and a second operational state in which the light emitted from its associated lamp is prevented from reaching said light valve;
    lamp driver means for activating said first, second and third lamps in synchronization with video information input to said light valve to sequentially illuminate said light valve with said first, second and third colors of light, said lamp driver means activating at least one of said lamps with electrical power when its associated occluder means is in said first and said second operational state, said lamp driver means including means for apportioning the electrical power between the electrical power applied to said lamp when said occluder means is in said first operational state and said second operational state so that the light output of said lamp is adjustable while the electrical input to the lamp remains constant.

2. The illumination system as claimed in claim 1 wherein said means for altering the color of said first, second and third lamps comprise dichroic filters positioned between said lamps and said light valve.

3. The illumination system as claimed in claim 1 wherein said occluder means comprise a rotating wheel located between at least one of said first, second and third lamps and said means for altering the color of the light, said occluder means having a light transmissive portion providing said first operational state and an opaque portion providing said second operational state.

4. The illumination system as claimed in claim 1 wherein said occluder means are positioned in front of two of said first, second and third lamps.

5. The illumination system as claimed in claim 3 wherein said rotating wheel is driven by a servo motor under the control of occluder driver means which receives a control input to synchronize the position of the rotating wheel in accordance with the lamp driver means.

6. The illumination system as claimed in claim 1 further including color sensing means for sensing the color of the light modulated by the light valve.

7. The illumination system as claimed in claim 1 wherein said lamp driver means activate said lamp with a series of pulses of predetermined amplitude.

8. In a video projection system having a light valve for modulating light impinging thereon, first, second and third lamps for illuminating the light valve, means for altering the color of the light of said first, second and third lamps so that said light valve is illuminated with first, second and third colors of light, lamp driver means for operating said first, second and third lamps so that the light valve is illuminated with the light of said first, second and third lamps sequentially, wherein the improvement comprises:
    occluder means disposed between at least two of said first, second and third lamps and said light valve, said occluder means having a first operational state in which the light of the associated lamp is permitted to reach the light valve and a second operational state in which the light from the associated lamp is blocked from reaching the light valve;
    wherein said lamp driver means for operating said lamps operate said lamps by a series of first and second pulses of electrical power, said first series of pulses occurring when said occluder means is in said first operational state and said second series of pulses occurring when said occluder means is in said second operational state; and
    means for adjusting the proportionality between the electrical power of the first series of pulses and the electrical power of said second series of pulses.

9. The projection system as claimed in claim 8 wherein said means for altering the light output by said first, second and third lamps comprise dichroic filters positioned between said lamps and said light valve.

10. The projection system as claimed in claim 8 wherein said occluder means comprise a rotating wheel located between at least one of said first, second and third lamps and the means for altering the color of the light, Said occluder means having a light transmissive portion providing said first operational state and an opaque portion providing said second operational state.

11. The projection system as claimed in claim 8 wherein said light valve comprises an array of reflective pixels moveable between an on and off state.

12. The projection system as claimed in claim 10 wherein said rotating wheel is driven by a synchronous motor under the control of an occluder driver means which receives a control input to synchronize the position of the occluder wheel in accordance with the first and second pulses to said lamps.

13. The projection system as claimed in claim 8 further including color sensing means for sensing the color of the light emitted by the light valve.

14. The projection system as claimed in claim 13 further including means for adjusting the proportionality between said first and second series of pulses based upon a signal output by said color sensing means.

15. The projection system as claimed in claim 8 further including user input means for varying the proportionality between said first and second pulses to said lamps.

* * * * *